No. 614,054. Patented Nov. 8, 1898.
W. G. KENDALL.
CUSHION TIRE.
(Application filed May 5, 1898.)
(No Model.)
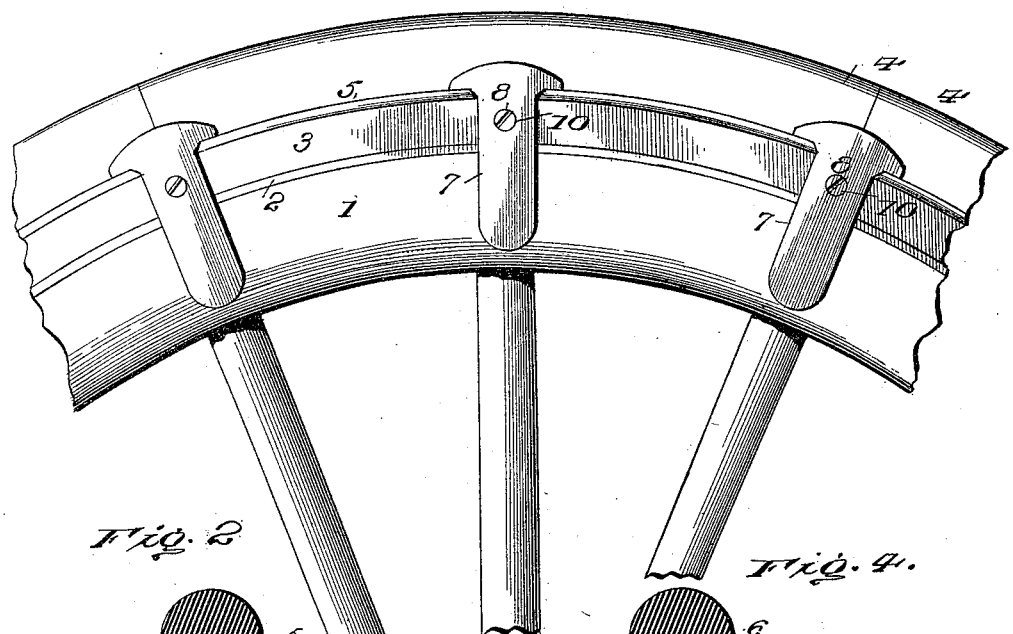
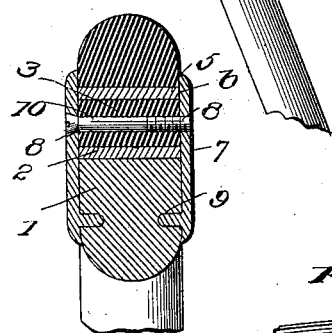
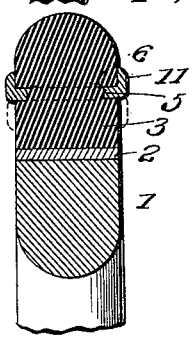
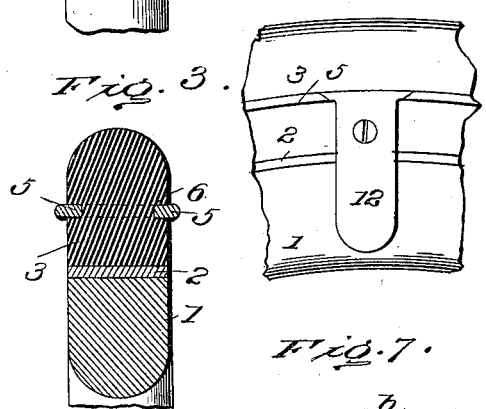
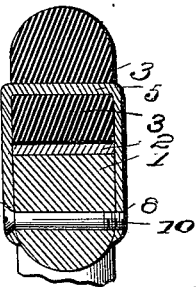
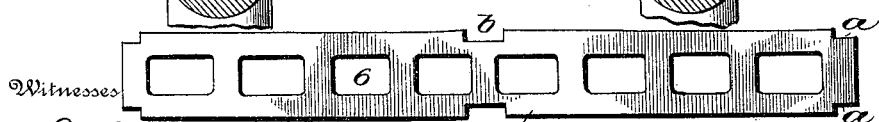
Witnesses
Inventor
W. G. Kendall
By J. R. Nottingham
Attorney

United States Patent Office.

WEBBER G. KENDALL, OF PROVIDENCE, RHODE ISLAND, ASSIGNOR TO THE KENDALL RUBBER TIRE COMPANY, OF SAME PLACE.

CUSHION-TIRE.

SPECIFICATION forming part of Letters Patent No. 614,054, dated November 8, 1898.

Application filed May 5, 1898. Serial No. 679,834. (No model.)

*To all whom it may concern:*

Be it known that I, WEBBER G. KENDALL, a citizen of the United States, residing at Providence, in the county of Providence and State of Rhode Island, have invented certain new and useful Improvements in Cushion-Tires; and I do hereby declare the following to be a full, clear, and exact description of the invention, such as will enable others skilled in the art to which it appertains to make and use the same.

My invention relates to rubber or cushion tires for vehicle-wheels; and it consists, essentially, in providing a rubber tire with a novelly-constructed reinforcing securing-band, the side edges of which project slightly beyond the sides of the tire to form the protecting guards or flanges and to afford a means by which the rubber tire may be securely clamped to an ordinary metal-tired wheel.

The invention further consists in certain novel means for securing the rubber tire to the wheel, whereby the usual securing-bolts, which pass down through the center of the securing or confining band and metal-tired rim and the channel in the inner periphery of the rubber tire, are dispensed with and all tendency of the tire to spread laterally is prevented.

The principal object of the invention is to produce a rubber tire which can be readily and quickly applied to the ordinary metal-tired wheel, and when applied the sides of its inner periphery will not be liable to lateral displacement and thereby injury or damage, as is the case where the rubber tire is formed with an opening in its inner periphery, and is secured onto the rim of the wheel by means of bolts which pass through a confining-band situated in the interior of the rubber tire and through said opening.

Another object of the invention is to provide means whereby the sides of the rubber tire will be effectually protected from undue wear and injury consequent upon coming into contact with the curbing of roadways and such other obstructions as are often met with in the travel of a vehicle.

In the accompanying drawings, Figure 1 is a side view of a portion of a wheel provided with my improved tire; Fig. 2, a transverse section taken through one of the clamping-plates; Fig. 3, a similar view taken through a slotted portion of the reinforcing-plate to show the body of the rubber extended through the slot to form a key on the inner side of the band; Figs. 4 and 5, similar views of a modified form of my invention; Fig. 6, a modification of the clamping-plate, and Fig. 7 a plan view of a reinforcing and securing band-section.

Referring to the several views, the numeral 1 indicates the rim or felly of the wheel, 2 the usual metal tire, and 3 the rubber tire or tread portion of the wheel. The tire 3 is composed, perferably, of a series of molded vulcanized india-rubber sections 4, and each section has embedded therein a reinforcing and securing band 5. The band-sections 5 consist of flat metal strips provided with a series of oblong slots 6, and the side edges of each end are notched, as shown at *a*, to form when placed end to end recesses for the reception of suitable clamping-plates, as will be hereinafter described.

In molding the reinforced rubber-tire sections the band-section is so positioned in the mold that the rubber, which is in a plastic form, will pass through the apertures, and spreading from side to side of the mold will completely embed the band, except the projecting side edges, in the tire-section, as clearly shown in Fig. 6, wherein it will be seen that the sides of the tire extend half-way between the sides of the slots and the side edges of the band.

The tire-sections are secured onto the wheel by means of T-head clamping-plates 7, which are provided with bolt-holes 8 and pins 9. The sections are placed in position around the wheel, and the clamping-plates are fitted in the recesses formed by the notches *a*, with the projecting ends of the T-heads resting upon the projecting side of the respective ends of the reinforcing and securing band, as shown in Fig. 1, and the pins 9 setting into holes made in the sides of the felly. The clamping-plates are secured together by screw-threaded bolts 10, which pass through holes made in the tire-sections below the band 5 and are screwed into the screw-threaded holes in the clamping-plates on the inside of the wheel.

To provide against any possible loosening of the rubber-tire sections, intermediate clamping-plates 7, which are fitted into recesses $b$ in the side edges of the band-sections 5, are employed.

It will be noticed that the clamping-plates are flush with the projecting side edges of the band-sections, and consequently are not liable to injury, being protected by said side edges, which also protect the sides of the rubber tire from undue wear.

In the modified forms of my invention the band-section in Fig. 4 is shown with upturned side flanges 11, which serve to strengthen the section when wheels for heavy vehicles are to be provided with the rubber tires, or the side edges of said sections may be provided with downwardly-turned flanges or with both upwardly and downwardly turned flanges.

In the modification shown in Fig. 5 the band-section is shown provided with integral clamping-plates 12, which are secured together to the sides of the wooden rim by a screw-threaded bolt.

In the modification shown in Fig. 6 the clamping-plate is provided with a dovetail head instead of a T-head, which is received or fits into the dovetail recess in the side edges of the band-section. This form of clamping-plate is especially desirable for light tread.

Various other modifications may be made without departing from the spirit of my invention or sacrificing the principle thereof—such, for instance, as dispensing with the projecting side edges of the reinforcing and securing band and having said side edges flush with the sides of the tire. In this case the clamping-plates would be preferably integral with the band.

While my improved cushion-tire is designed to be secured onto metal-tired wheels, it will be evident that it may be applied directly to the wooden rim, thus dispensing with the metal tire.

Having thus fully described my invention, what I claim, and desire to secure by Letters Patent, is—

1. A rubber tire composed of one or more sections, each section having embedded therein a slotted reinforcing-band, the side edges of which project slightly beyond the sides of the tire to form protecting-guards.

2. The combination with the rim of a wheel, of a rubber tire having embedded therein a slotted reinforcing-band, whose side edges project slightly beyond the sides of the tire, to form protecting-guards, and means for securing the tire onto said rim.

3. The combination with the rim of a wheel, of a sectional rubber tire, each section having embedded therein a slotted reinforcing-band, the side edges of which band project slightly beyond the sides of the tire to form guards and a securing medium, and means attached to said band for securing the tire onto said rim.

4. The combination, with the rim of a wheel, of a rubber tire composed of two or more sections, forming a continuous tread, each section having embedded therein a slotted reinforcing-plate having its side edges projecting beyond the sides of the rim, to form tire-protecting guards, and provided with recesses, T-head securing-clamps, adapted to be received in said recesses, and bolts for securing the clamps, and thereby the tire, onto the wheel.

In testimony whereof I affix my signature in the presence of two witnesses.

WEBBER G. KENDALL.

Witnesses:
H. R. HOWENSTEIN,
J. R. NOTTINGHAM.